(12) United States Patent
Tsuru et al.

(10) Patent No.: US 7,711,197 B2
(45) Date of Patent: May 4, 2010

(54) METHOD AND APPARATUS FOR DETERMINING A QUANTIZATION SCALE OF ENCODED DATA

(75) Inventors: Daisuke Tsuru, Tokyo (JP); Hideyuki Ichihashi, Saitama (JP); Yuji Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 534 days.

(21) Appl. No.: 10/561,595

(22) PCT Filed: Apr. 19, 2005

(86) PCT No.: PCT/JP2005/007472

§ 371 (c)(1),
(2), (4) Date: Dec. 20, 2005

(87) PCT Pub. No.: WO2005/104561

PCT Pub. Date: Nov. 3, 2005

(65) Prior Publication Data

US 2007/0122047 A1   May 31, 2007

(30) Foreign Application Priority Data

Apr. 20, 2004 (JP) .............................. 2004-123753

(51) Int. Cl.
G06K 9/36 (2006.01)
G06K 9/46 (2006.01)
H04B 1/66 (2006.01)
H04N 7/12 (2006.01)
H04N 11/02 (2006.01)
H04N 11/04 (2006.01)

(52) U.S. Cl. .................. 382/239; 382/166; 382/236; 375/240.03

(58) Field of Classification Search .............. 382/232, 382/236, 239, 250, 251, 166; 375/240.03, 375/240.2
See application file for complete search history.

(56) References Cited

U.S. PATENT DOCUMENTS

| 5,731,835 | A  | * | 3/1998  | Kuchibholta ............ 348/390.1 |
| 6,195,388 | B1 | * | 2/2001  | Choi et al. ............. 375/240.05 |
| 7,266,148 | B2 | * | 9/2007  | Kim ...................... 375/240.03 |
| 2002/0034246 | A1 | * | 3/2002  | Yamada et al. ......... 375/240.03 |
| 2004/0234142 | A1 | * | 11/2004 | Chang et al. ................ 382/236 |
| 2005/0084007 | A1 | * | 4/2005  | Lightstone et al. ..... 375/240.03 |
| 2005/0129112 | A1 | * | 6/2005  | Ichihashi et al. ....... 375/240.03 |

FOREIGN PATENT DOCUMENTS

| JP | 7-177513   | 7/1995  |
| JP | 10-75443   | 3/1998  |
| JP | 10-164588  | 6/1998  |
| JP | 10-174103  | 6/1998  |
| JP | 2003-299081 | 10/2003 |

* cited by examiner

*Primary Examiner*—Yubin Hung
(74) *Attorney, Agent, or Firm*—Finnegan, Henderson, Farabow, Garrett & Dunner, L.L.P.

(57) ABSTRACT

A bit rate by which encoded data is supplied for decoding at the time of decoding is specified based on the encoded data obtained by encoding. Further, an encoding difficulty of processed data is detected. Then, a quantization scale is controlled based on the specified bit rate and the detected encoding difficulty.

12 Claims, 11 Drawing Sheets

METHOD AND APPARATUS FOR DETERMINING A QUANTIZATION SCALE OF ENCODED DATA

TECHNICAL FIELD

The present invention relates to a data processing apparatus able to suitably determine a quantization scale and a method and an encoding device of the same.

BACKGROUND ART

In recent years, apparatuses have been developed based on the MPEG (Moving Picture Experts Group), JVT (Joint Video Team), or other standards which handle image data and, for the purpose of transmitting and storing information having a high efficiency, utilize the redundancy unique to image information so as to compress the data by application of a discrete cosine transform or other orthogonal transform and by motion compensation.

An encoding device of such a standard utilizes local information of the image so as to realize high efficiency encoding.

An image by nature is not readily discernable in deterioration of image quality by the naked eye even when a complex portion in the image is encoded by making the quantization rougher than that for the other portions.

Accordingly, a conventional encoding device divides an image into a plurality of portions, detects a degree of complexity of the image for each portion, roughly quantizes complex portions of the image based on the detection result, and finely quantizes portions which are not complex so as to suppress the influence of deterioration of the image quality and at the same time reduce the amount of data.

The information of the degree of complexity of an image is called "activity".

A conventional encoding device calculates the activity of the image data to be quantized and generates a quantization scale defining the quantization scale for each picture based on the activity. Namely, it determines an amount of bits assigned to a picture for each picture.

The encoded data generated by the encoding device is stored in a buffer CPB (coded picture buffer) in a decoding device, then the pictures composing the encoded data are sequentially supplied to the decoding unit with a predetermined picture rate for decoding.

Here, the amount of reduction of the amount of stored data of the buffer CPB by the supply of one picture from the buffer CPB to the decoding unit depends upon the amount of data of the picture, that is, the quantization parameter of the picture.

Accordingly, the encoding device must determine the quantization scale so that the buffer CPB of the decoding device does not underflow.

DISCLOSURE OF THE INVENTION

Problem to be Solved by the Invention

However, in the above conventional encoding device, the quantization scale of each picture is determined based on only the activity of the image data to be quantized, therefore sometimes the amount of data of the picture finally encoded so as to suitably hold the state of the buffer CPB cannot be controlled and there is the problem that the quality of the decoded image is low.

The present invention was made in consideration with such a circumstance and has as an object thereof to provide a data processing apparatus able to generate encoded data able to give a high quality decoded image and a method and an encoding device of the same.

Means for Solving the Problem

To solve the above problem of the prior art and achieve the above object, there is provided a data processing apparatus for determining a quantization scale of the quantization when quantizing and encoding processed data, comprising a specifying circuit for specifying a bit rate by which the encoded data is supplied for decoding at the time of the decoding based on the encoded data obtained by the encoding; an encoding difficulty detection circuit for detecting the difficulty of encoding of the processed data; and a quantization control circuit for controlling the quantization scale based on the bit rate specified by the specifying circuit and the encoding difficulty detected by the encoding difficulty detection circuit.

The mode of operation of the data processing apparatus of the first invention becomes as follows.

The specifying circuit specifies the bit rate by which the related encoded data is supplied for decoding at the time of decoding based on the encoded data obtained by the encoding.

Further, the encoding difficulty detection circuit detects the encoding difficulty of the processed data.

Further, the quantization control circuit controls the quantization scale based on the bit rate specified by the specifying circuit and the encoding difficulty detected by the encoding difficulty detection circuit.

The data processing method of a second aspect of the invention is a data processing method for determining a quantization scale of quantization when quantizing and encoding processed data, comprising a first step of specifying a bit rate by which the encoded data is supplied for decoding at the time of the decoding based on the encoded data obtained by the encoding; a second step of detecting the encoding difficulty of the processed data; and a third step of controlling the quantization scale based on the bit rate specified at the first step and the encoding difficulty detected at the second step.

The mode of operation of the data processing method of the second aspect of the invention becomes as follows.

At the first step, the bit rate by which the encoded data is supplied for decoding at the time of decoding is specified based on the encoded data obtained by the encoding.

Further, at the second step, the encoding difficulty of the processed data is detected.

Further, at the third step, the quantization scale is controlled based on the bit rate specified at the first step and the encoding difficulty detected at the second step.

An encoding device of the third aspect of the invention has a quantization scale calculation circuit for calculating the quantization scale, a quantization circuit for quantizing the processed data based on the quantization scale calculated by the quantization scale calculation circuit, and an encoding circuit for generating the encoded data by encoding the quantization result of the quantization circuit, the quantization scale calculation circuit having a specifying circuit for specifying a bit rate by which the encoded data is supplied for decoding at the time of decoding based on encoded data generated by the encoding circuit, an encoding difficulty detection circuit for detecting an encoding difficulty of the processed data, and a quantization control circuit for controlling the quantization scale based on the bit rate specified by the specifying circuit and the encoding difficulty detected by the encoding difficulty detection circuit.

The mode of operation of the encoding device of the third aspect of the invention becomes as follows.

The quantization scale calculation circuit calculates the quantization scale by a mode of operation similar to that of the first aspect of the invention.

Next, the quantization circuit quantizes the processed data based on the quantization scale calculated by the quantization scale calculation circuit.

Next, the encoding circuit encodes the quantization result of the quantization circuit to generates the encoded data.

EFFECTS OF THE INVENTION

According to the present invention, there can be provided a data processing apparatus able to generate encoded data able to give a high quality decoded image and a method and an encoding device of the same.

DESCRIPTION OF NOTATIONS

1 . . . communication system, 2 . . . encoding device, 3 . . . decoding device, 4 . . . decoding unit, 5 . . . decoding difficulty detection circuit, 6 . . . image difficulty indicator generation circuit, 10 . . . MBR measurement circuit, 11 . . . a CPBOC calculation circuit, 12 . . . LT adjustment amount calculation circuit, 13 . . . ST adjustment amount calculation circuit, 14 . . . CTBR calculation circuit, 15 . . . delay circuit, 16 . . . PicQ control circuit, 17 . . . MBQ control circuit, 22 . . . A/D conversion circuit, 23 . . . picture rearrangement circuit, 24 . . . processing circuit, 25 . . . orthogonal transform circuit, 26 . . . quantization circuit, 27 . . . reversible encoding circuit, 28 . . . buffer, 29 . . . inverse quantization circuit, 30 . . . inverse orthogonal transform circuit, 31 . . . frame memory, 32 . . . motion prediction and/or compensation circuit, 33 . . . activity calculation circuit, 34 . . . Q calculation circuit, CPB . . . buffer

BEST MODE FOR WORKING THE INVENTION

Below, an image processing apparatus according to an embodiment of the present invention will be explained.

Below, an image processing apparatus of the present embodiment for solving the above problem and a method and an encoding device of the same will be explained.

Figure 1:
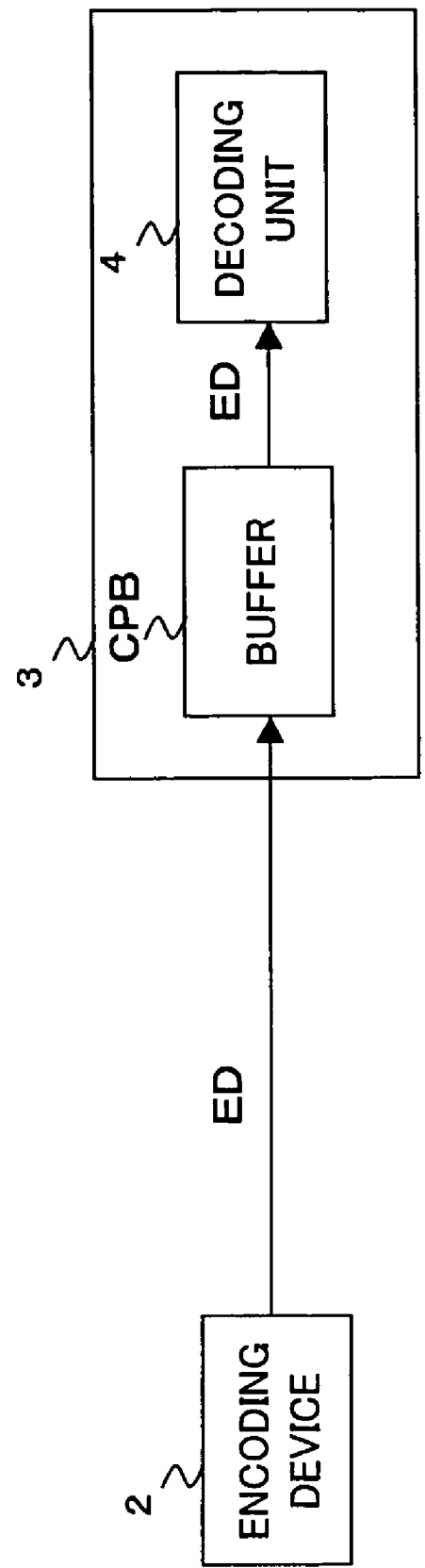
FIG. 1 is a view of the overall configuration of an image processing system of an embodiment of the present invention.

FIG. 1 is a view of the overall configuration of an image processing system 1 of the present embodiment.

As shown in FIG. 1, the image processing system 1 has an encoding device 2 and a decoding device 3. The encoding device 2 generates encoded data ED (bit stream) compressed by a discrete cosine transform, Karhunen Loeve transform, or other orthogonal transform and motion compensation, modulates the encoded data ED, then transmits the same via a satellite broadcast wave, cable TV network, telephone line network, mobile phone line network, or other transmission medium.

The decoding device 3 for example demodulates the encoded data ED received from the encoding device 2, then stores the same in a buffer CPB, supplies the encoded data ED read out from the buffer CPB (memory circuit of the present invention) to the decoding unit 4, generates the image data decoded by the inverse transform to the orthogonal transform at the time of the encoding and motion compensation in the decoding unit 4, and utilizes the same.

Here, the amount of the reduction of the amount of data stored by the buffer CPB by the supply of one picture from the buffer CPB to the decoding unit 4 depends upon the amount of data of the picture, that is, the quantization parameter of the picture.

Therefore, the encoding device has to determine the quantization scale so that the buffer CPB of the decoding device 3 will not overflow and underflow as will be explained later.

Note that the transmission medium may be a storage medium such as an optical disk, magnetic disk, and semiconductor memory as well.

The image processing system 1 is characterized in the method of calculation of the quantization scale in the encoding device 2.

Below, the encoding device 2 shown in FIG. 1 will be explained.

The encoding device 2 corresponds to the encoding device of the inventions.

Figure 2:
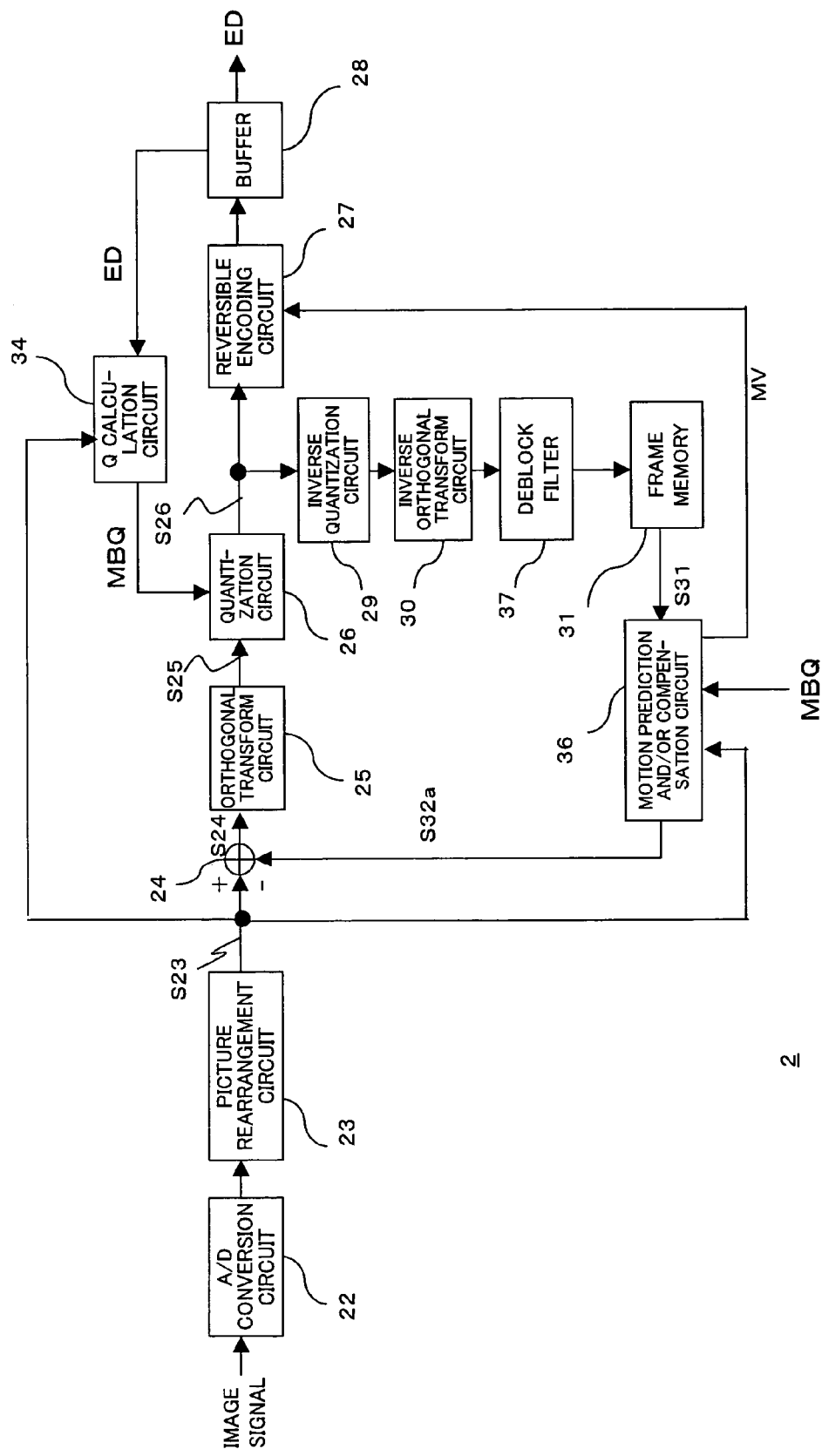
FIG. 2 is a view of the configuration of an encoding device 2 shown in FIG. 1.

FIG. 2 is a view of the configuration of the encoding device 2 shown in FIG. 1.

As shown in FIG. 2, the encoding device 2 has for example an A/D conversion circuit 22, a picture rearrangement circuit 23, a processing circuit 24, an orthogonal transform circuit 25, a quantization circuit 26, a reversible encoding circuit 27, a buffer 28, an inverse quantization circuit 29, an inverse orthogonal transform circuit 30, a frame memory 31, a Q calculation circuit 34, a motion prediction and/or compensation circuit 36, and a deblock filter 37.

The quantization circuit 26 is an example of the quantization circuit of the third aspect of the invention, the reversible encoding circuit 27 is an example of the encoding circuit of the third aspect of the invention, and the Q calculation circuit 34 is an example of the data processing apparatus of the first aspect of the invention and the quantization scale calculation circuit of the third aspect of the invention.

Below, components of the encoding device 2 shown in FIG. 2 will be explained.

The A/D conversion circuit 22 converts an input analog image signal comprised of a luminance signal Y and color difference signals Pb and Pr to a digital image signal and outputs this to the picture rearrangement circuit 23.

The picture rearrangement circuit 23 outputs image data S23 (processed data of the present invention) obtained by rearranging frame image signals in image signals input from the A/D conversion circuit 22 to a sequence of encoding in accordance with a GOP (Group Of Pictures) structure comprised by picture types I, P, and B thereof to the processing circuit 24, the motion prediction and/or compensation circuit 36, and the Q calculation circuit 34.

When the image data S23 is inter-encoded, the processing circuit 24 generates image data S24 indicating the difference between the image data S23 and predicted image data S32a input from the motion prediction and/or compensation circuit 36 and outputs this to the orthogonal transform circuit 25.

Further, when the image data S23 is intra-encoded, the processing circuit 24 outputs the image data S23 as the image data S24 to the orthogonal transform circuit 25.

The orthogonal transform circuit 25 applies a discrete cosine transform or Karhunen Loeve transform or other orthogonal transform to the image data S24 to generate image data (for example DCT coefficient signal) S25 and outputs this to the quantization circuit 26.

The quantization circuit 26 quantizes the image data S25 in units of macro blocks MB with the quantization scale MBQ input from the Q calculation circuit 34 to generate image data S26 and outputs this to the reversible encoding circuit 27 and the inverse quantization circuit 29.

The reversible encoding circuit 27 performs variable length encoding or arithmetic encoding on the image data S26 to generate the encoded data ED and stores this in the buffer 28.

At this time, the reversible encoding circuit 27 encodes the motion vector MV input from the motion prediction and/or compensation circuit 36 or the difference thereof and stores the same in header data of the encoded data ED.

The encoded data ED stored in the buffer 28 is output to the Q calculation circuit 34 and, at the same time, for example modulated, then is transmitted to the decoding device 3 shown in FIG. 1.

The inverse quantization circuit 29 generates the data by inverse quantizing the image data S26 and outputs this to a display 40.

The inverse quantization circuit 29 performs the quantization processing based on the JVT standard.

The inverse orthogonal transform circuit 30 applies an inverse transform to the orthogonal transform described above to the inverse quantized data input from the inverse quantization circuit 29 to generate the image data and outputs the same to the deblock filter 37.

The deblock filter 37 strips block distortion from the image data input from the inverse quantization transform circuit 30 and writes the data into the frame memory 31.

The motion prediction and/or compensation circuit 36 performs the motion prediction and/or compensation processing based on the image data S31 from the frame memory 31 and the image data S23 from the picture rearrangement circuit 23 to calculate the motion vector MV and the predicted image data S32a.

Note that the motion prediction and/or compensation circuit 36 determines a macro block type based on the quantization scale MBQ of the macro block MB from the Q calculation circuit 34 and performs the motion prediction and/or compensation processing using the block prescribed by the determined macro block type as the units.

The motion prediction and/or compensation circuit 36 outputs the motion vector MV to the reversible encoding circuit 27 and outputs the predicted image data S32a to the processing circuit 24.

The Q calculation circuit 34 calculates the quantization scale PicQ of each picture based on the image data S23 from the picture rearrangement circuit 23 and the encoded data ED from the buffer 28.

Specifically, the Q calculation circuit 34 calculates the quantization scale MBQ of each macro block MB composing each picture based on the calculated quantization scale PicQ and outputs this to the quantization circuit 26 and the motion prediction and/or compensation circuit 36.

Below, the method of calculating the quantization scale PicQ based on the image data S23 and the encoded data ED will be explained.

The Q calculation circuit 34 controls the quantization scale PicQ of each picture, that is, the amount of data of each picture, so that the amount of data of the encoded data ED stored in the buffer CPB approaches a suitable value (initial value InitialCpb) while considering the state of the buffer CPB of the decoding device 3 shown in FIG. 1 other than the encoding difficulty of the image data S23.

Here, the number of pictures read out from the buffer CPB in the unit time and supplied to the decoding unit 4 is a constant number prescribed by the picture rate, therefore, by controlling the amount of data of each picture by the Q calculation circuit 34, the amount of data (amount stored in buffer accumulation) of the encoded data ED stored in the buffer CPB can be controlled.

Below, the configuration of the Q calculation circuit 34 shown in FIG. 2 will be explained in detail.

Figure 3:
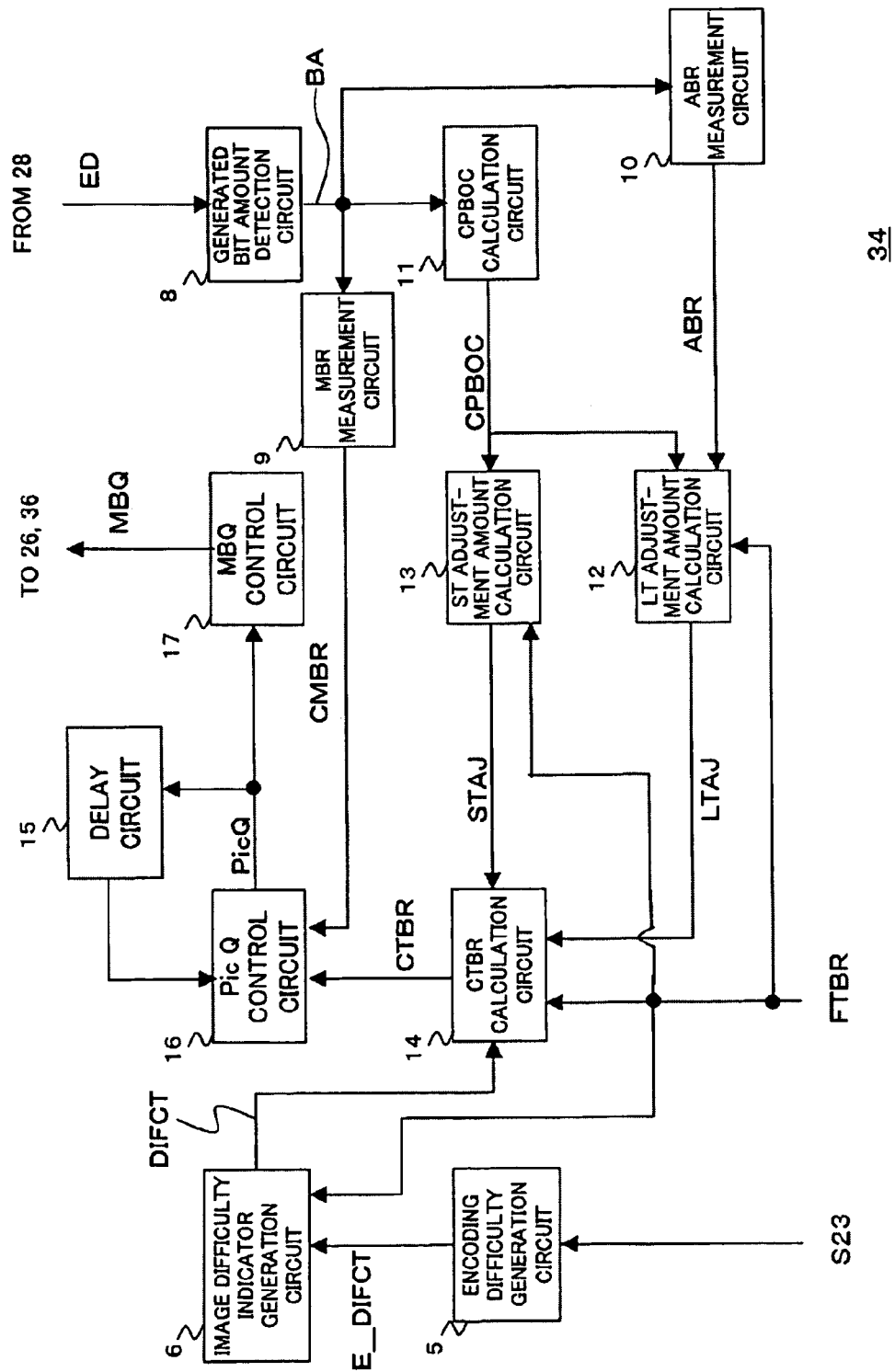
FIG. 3 is a view of the configuration of a Q calculation circuit shown in FIG. 2 relating to a portion generating a quantization scale MBQ based on encoded data ED.

FIG. 3 is a view of the configuration of the Q calculation circuit 34 shown in FIG. 2 relating to the portion for generating the quantization scale MBQ based on the encoded data ED.

As shown in FIG. 3, the Q calculation circuit 34 has for example an encoding difficulty detection circuit 5, an image difficulty indicator generation circuit 6, a generated bit amount detection circuit 8, an MBR measurement circuit 9, an ABR measurement circuit 10, a CPBOC calculation circuit 11, an LT adjustment amount calculation circuit 12, an ST adjustment amount calculation circuit 13, a CTBR calculation circuit 14, a delay circuit 15, a PicQ control circuit 16, and an MBQ control circuit 17.

In FIG. 3, the MBR measurement circuit 9 corresponds to the specifying circuit of the first and third aspects of the invention, the encoding difficulty detection circuit 5 and the image difficulty indicator generation circuit 6 correspond to the encoding difficulty detection circuit of the first and third aspects of the invention, and the PicQ control circuit 16 corresponds to the quantization control circuit of the first and third aspects of the invention.

Further, the CPBOC calculation circuit 11 corresponds to the indicator generation circuit of the first aspect of the invention, and the LT adjustment amount calculation circuit 12, the ST adjustment amount calculation circuit 13, and the CTBR calculation circuit 14 correspond to the target calculation circuit of the first aspect of the invention.

[Encoding Difficulty Detection Circuit 5]

The encoding difficulty detection circuit 5 detects the encoding difficulty of the image data S23 input from the picture rearrangement circuit 23 and outputs encoding difficulty data E_DIFCTED indicating the detected encoding difficulty to the image difficulty indicator generation circuit 6.

The encoding difficulty detection circuit 5 specifically generates the encoding difficulty data E_DIFCTED so that the value becomes larger as a larger number of image patterns are included based on the image pattern which becomes a factor generating block noise or mosquito noise included in the frame of the image data S23, for example, vigorous motion and vigorous luminance changes (or scene change) in fine picture patterns.

[Image Difficulty Indicator Generation Circuit 6]

The image difficulty indicator generation circuit 6 multiplies the predetermined difficulty coefficient, the designated final target bit rate FTBR, and the encoding difficulty data E_DIFCT input from the encoding difficulty detection circuit 5 as shown in the following Equation (1) to generate the image difficulty indicator data DIFCT.

The image difficulty indicator generation circuit 6 outputs the generated image difficulty indicator data DIFCT to the CTBR calculation circuit 14.

(Equation 1)

$$DIFCT=(\text{Difficulty coefficient})*FTBR*E\_DIFCT \quad (1)$$

Note that the image difficulty indicator generation circuit 6 calculates the image difficulty indicator data DIFCT using for example a constant time, several pictures, or several GOP's as units.

In the present embodiment, by treating the image difficulty indicator data DIFCT as a relative indicator from the overall sequence, it is possible to realize a variable bit rate of multi-paths and possible to realize a variable bit rate of a single path by using it for a portion of the sequence.

[Generated Bit Amount Detection Circuit 8]

The generated bit amount detection circuit 8 detects the amount of bits (amount of generated bits) of the encoded data ED (bit stream) input from the buffer 28 shown in FIG. 2 and outputs bit amount data BA indicating the result to the MBR measurement circuit 9, the ABR measurement circuit 10, and the CPBOC calculation circuit 11.

[MBR Measurement Circuit 9]

The MBR measurement circuit 9 calculates the measurement bit rate CMBR (bit rate specified by the specifying circuit of the present embodiment) indicating the bit rate of each picture composing the encoded data ED based on the bit amount data BA input from the generated bit amount detection circuit 8 and outputs this to the PicQ control circuit 16.

The measurement bit rate CMBR indicates the bit rate by which the encoded data ED is read out from the buffer CPB and output to the decoding unit 4 in the decoding device 3 shown in FIG. 1.

Figure 4:
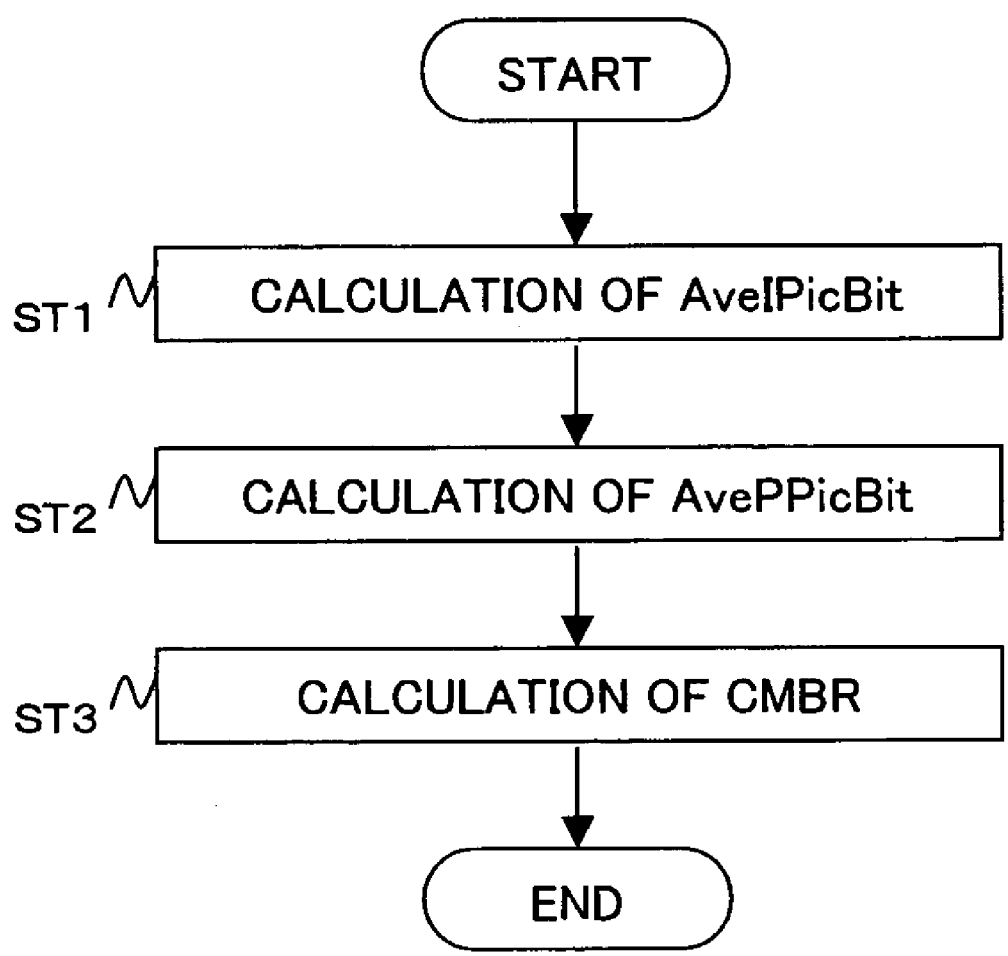
FIG. 4 is a flow chart for explaining processing of an MBR measurement circuit shown in FIG. 3.
Figure 5:
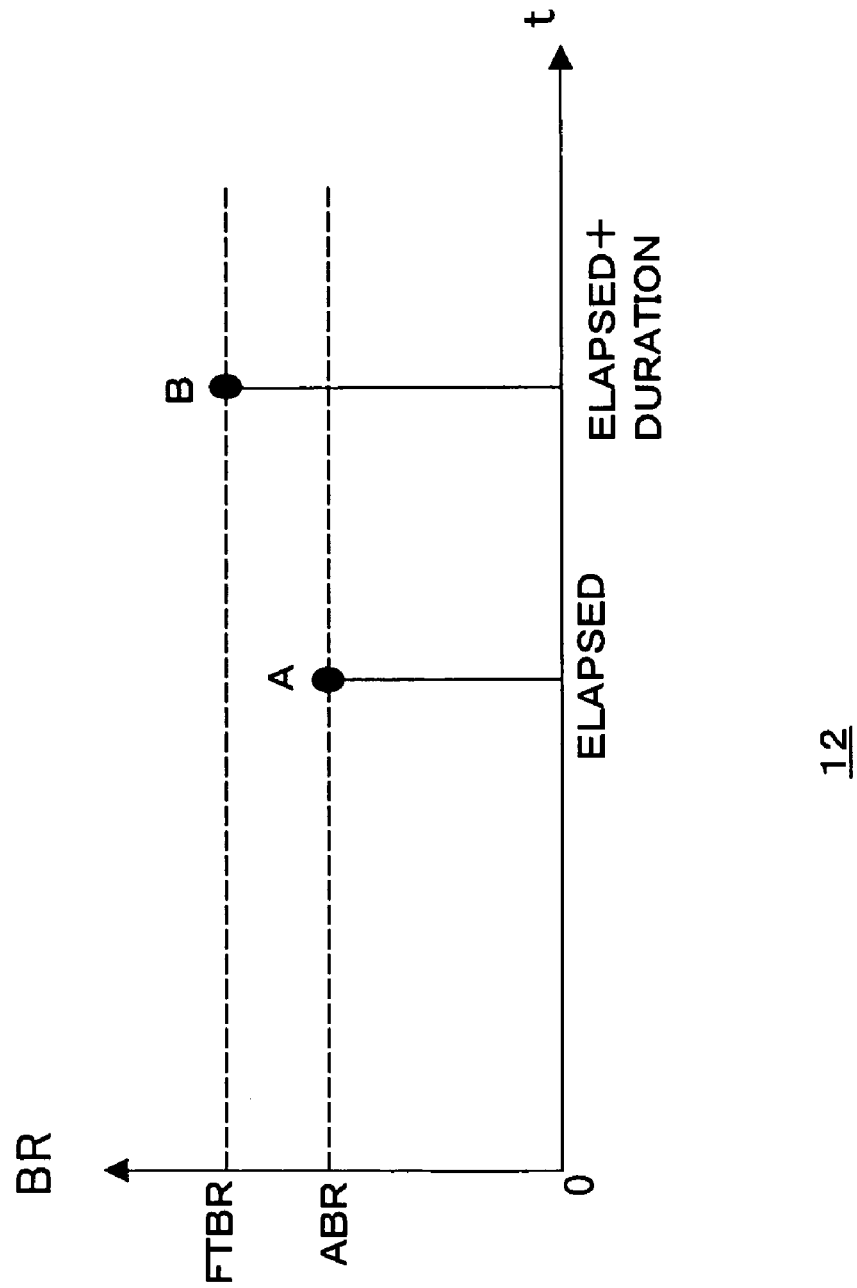
FIG. 5 is a diagram for explaining the processing of an LT adjustment amount calculation circuit shown in FIG. 3.
Figure 6:
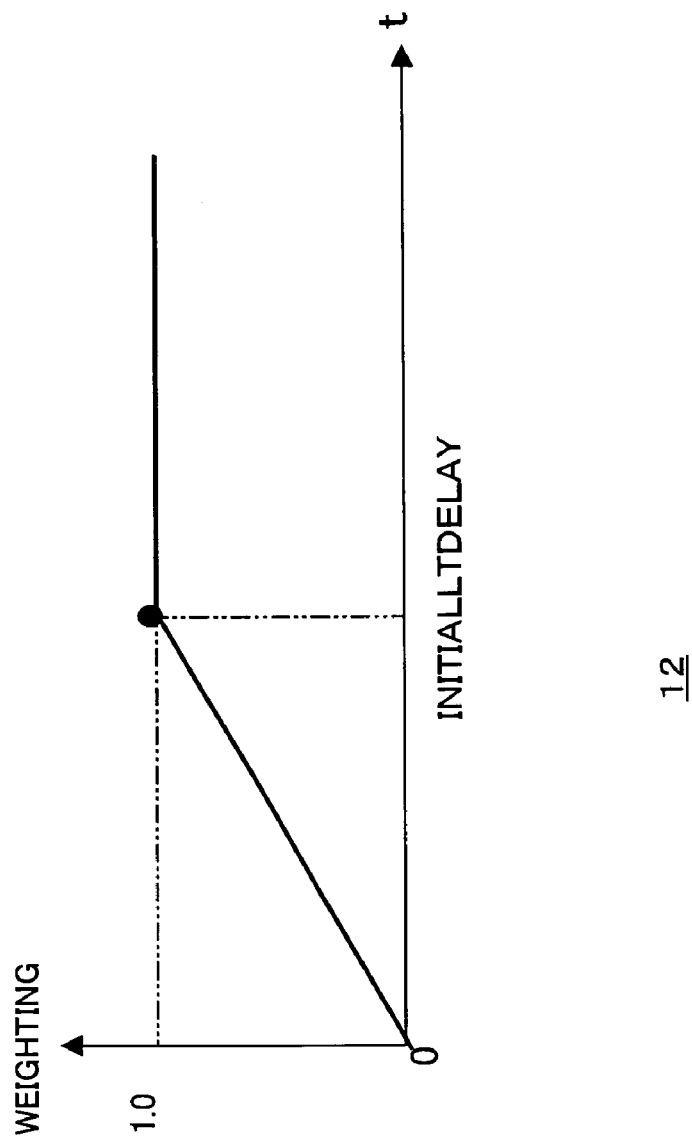
FIG. 6 is a diagram for explaining the processing of the LT adjustment amount calculation circuit shown in FIG. 3.

FIG. 4 is a flow chart for explaining the processing of the MBR measurement circuit 9.

Step ST1:

The MBR measurement circuit 9 calculates an average bit amount AveIPicBit of I pictures composing the encoded data ED encoded in the past based on the bit amount data BA input from the generated bit amount detection circuit 8.

Step ST2:

The MBR measurement circuit 9 calculates the average bit amount AvePPicBit of P pictures composing the encoded data ED encoded in the past.

Step ST3:

The MBR measurement circuit 9 calculates the measurement bit rate CMBR by the following Equation (2) based on AveIPicBit calculated at step ST1 and the AvePPicBit calculated at step ST2.

(Equation 2)

$$CMBR=PicR*(AveIPicBit+ AvePPicBit*PPicNumInGop)/TotalPicNumInGop \quad (2)$$

In the above Equation (2), TotalPicNumInGop is a constant indicating the number of pictures in one GOP and is set previously.

Further, PPicNumInGop indicates (TotalPicNumInGop−1)

[ABR Measurement Circuit 10]

The ABR measurement circuit 10 calculates the cumulative amount of bits (amount of data) composing the encoded data ED based on the bit amount data BA input from the generated bit amount detection circuit 8 and calculates the average bit rate ABR based on this.

Specifically, the ABR measurement circuit 10 calculates the average bit rate ABR based on the cumulative value of the bit amount data BA obtained after starting the encoding of the content of the encoding target in the encoding device 2.

The ABR measurement circuit 10 outputs the above calculated average bit rate ABR to the LT adjustment amount calculation circuit 12.

[CPBOC Calculation Circuit 11]

The CPBOC calculation circuit 11 calculates the indicator data CPBOC indicating the amount of data (amount of stored data) of the encoded data ED stored in the buffer CPB of the decoding device 3 based on the bit amount data BA input from the generated bit amount detection circuit 8.

The CPBOC calculation circuit 11 outputs the indicator data CPBOC to the LT adjustment amount calculation circuit 12 and the ST adjustment amount calculation circuit 13.

[LT Adjustment Amount Calculation Circuit 12]

The LT adjustment amount calculation circuit 12 calculates the adjustment amount LTAJ for adjusting the target bit rate CTBR so that the measurement bit rate CMBR approaches the final target bit rate FTBR.

The LT adjustment amount calculation circuit 12 calculates the adjustment amount LTAJ of the target bit rate CTBR explained later based on the indicator data CPBOC from the CPBOC calculation circuit 11 and the average bit rate ABR from the ABR measurement circuit 10.

Here, the adjustment amount LTAJ is for adjustment so as to prevent the target bit rate CTBR from becoming negative.

The LT adjustment amount calculation circuit 12 calculates the adjustment amount LTAJ of the target bit rate CTBR by the following Equation (3) based on the final target bit rate FTBR (final target bit rate of the present invention) designated from the outside of the encoding device 2, the average bit rate ABR input from the ABR measurement circuit 10, an encoding elapsed time ELAPSED, and a correction period DURATION.

Here, the encoding elapsed time ELAPSED indicates a time from when the encoding of the content as the encoding target is started at the encoding device 2 to when the frame in the content is next encoded.

Further, the correction period DURATION is the period during which for example the target bit rate CTBR is updated.

The LT adjustment amount calculation circuit 12 calculates the adjustment amount LTAJ so that the final target bit rate FTBR is obtained after the elapse of the correction period DURATION for the average bit rate ABR at the timing of the encoding elapsed time ELAPSED.

(Equation 3)

$$LTAJ=(FTBR-ABR)*(ELAPSED+DURATION)/DURATION \quad (3)$$

Note that, in order to suppress the influence of the unstable average bit rate ABR immediately after the start of the encoding, the LT adjustment amount calculation circuit 12 may calculate the adjustment amount LTAJ of the target bit rate CTBR as shown in the following Equation (4) as well.

In the following Equation (4), the initial value InitialLT-Delay is a constant value defined for suppressing the influence of the initial fluctuation of the adjustment amount LTAJ and is for example 5 (sec).

(Equation 4)

$$LTAJ = \min(1.0, ELAPSED/\text{initial}LT\text{Delay}) * LTAJ \qquad (4)$$

The LT adjustment amount calculation circuit 12 calculates the adjustment amount LTAJ so that it becomes the adjustment amount LTAJ calculated in the above Equation (3) or less while the encoding elapsed time ELAPSED is the initial value initialLTDelay, while makes it approach the adjustment amount LTAJ calculated in the above Equation (3) along with the encoding elapsed time ELAPSED approaching the initial value initialLTDelay.

The adjustment amount LTAJ has a value indicating a positive value when the indicator data CPBOC is the initial value initialCpb or more, that is, making adjustment in a direction raising the target bit rate CTBR.

Further, the adjustment amount LTAJ has a value indicating a negative value when the indicator data CPBOC is less than the initial value initialCpb, that is, making adjustment in a direction lowering the target bit rate CTBR.

Further, the adjustment amount LTAJ is defined so as not to become smaller than a predetermined value even when the indicator data CPBOC becomes the predetermined value or less. By this, the target bit rate CTBR becoming negative is avoided.

The characteristic feature of the adjustment amount LTAJ explained above is obtained by the LT adjustment amount calculation circuit 12 calculating the adjustment amount LTAJ of the target bit rate CTBR by the above Equations (3) and (4).

Note that the LT adjustment amount calculation circuit 12 calculates the adjustment amount LTAJ for example for a constant time using several pictures or several GOP's as units.

[ST Adjustment Amount Calculation Circuit 13]

The ST adjustment amount calculation circuit 13 calculates the adjustment amount STAJ for adjusting the target bit rate CTBR so that the buffer CPB of the decoding device 3 does not underflow.

The ST adjustment amount calculation circuit 13 calculates the adjustment amount STAJ of the target bit rate CTBR based on the indicator data CPBOC from the CPBOC calculation circuit 11.

Here, the adjustment amount STAJ acts to return the indicator data CPBOC to the initial value initialCpb.

Figure 7:
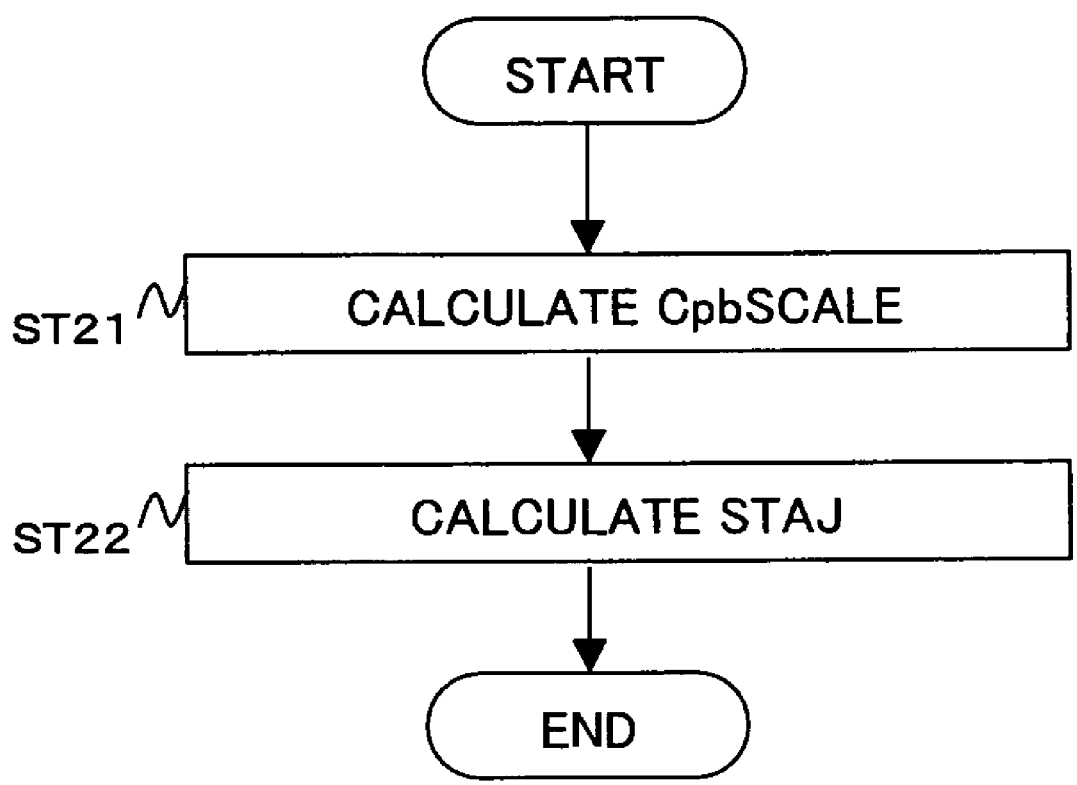
FIG. 7 is a flow chart for explaining the processing of an ST adjustment amount calculation circuit shown in FIG. 3.

FIG. 7 is a flow chart for explaining the processing of the ST adjustment amount calculation circuit 13.

Step ST21:

The ST adjustment amount calculation circuit 13 calculates data CpbScale by the following Equation (5) by using the indicator data CPBOC input from the CPBOC calculation circuit 11.

(Equation 5)

$$Cpb\text{Scale} = ((\text{Scale}*(\text{Init}Cpb - CPBOC) + CPBOC)/((\text{Init}Cpb - CPBOC) + \text{Scale}*(CPBOC))) \qquad (5)$$

Figure 8:
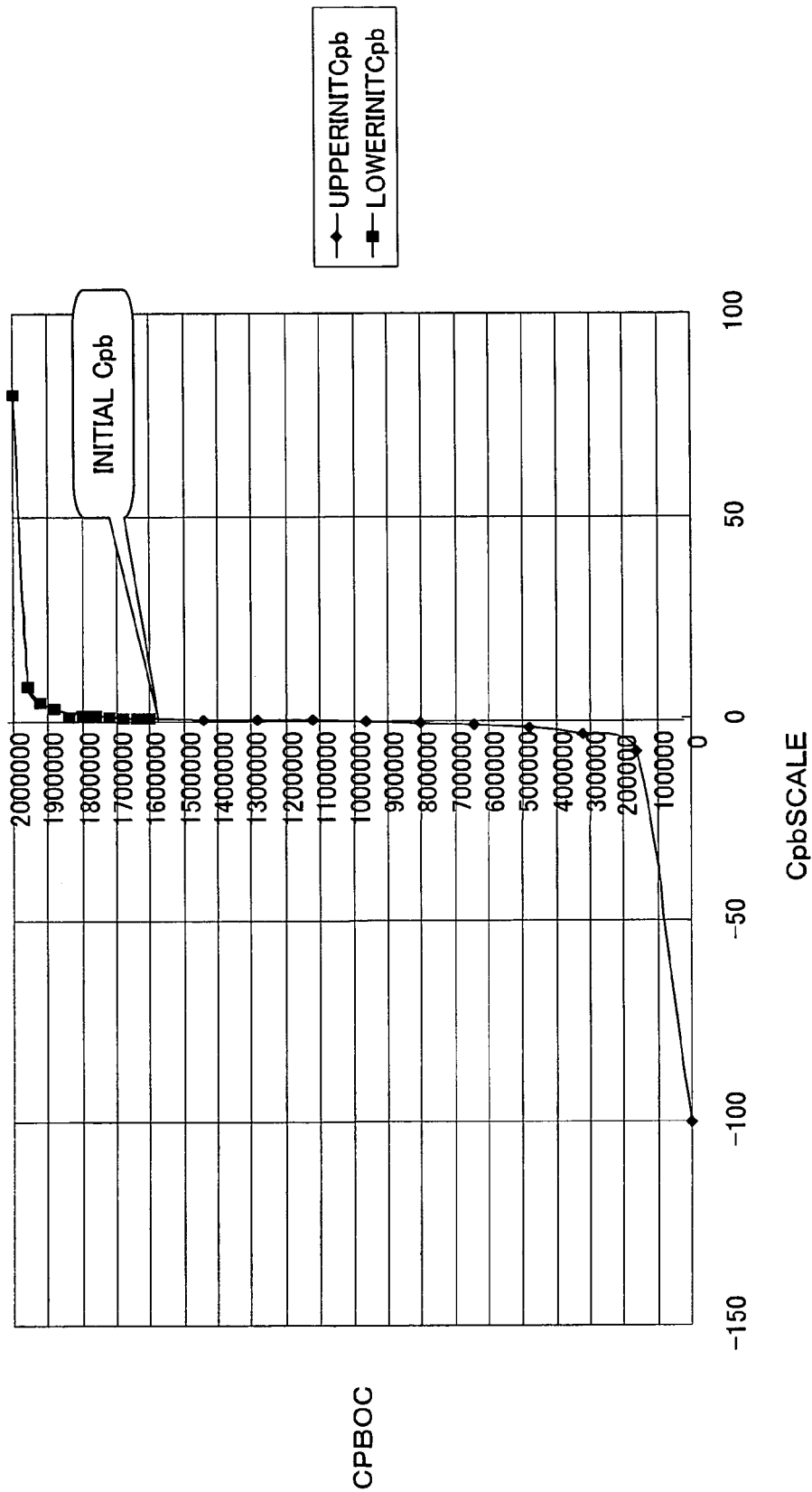
FIG. 8 is a diagram showing a relationship between data CpbScale and indicator data CPBOC.

FIG. 8 is a diagram showing a relationship between the data CpbSclae and the indicator data CPBOC.

As shown in FIG. 8, the data CpbScale has a value indicating a predetermined positive value K when the indicator data CPBOC is the initial value initialCpb or more, that is, making an adjustment in a direction raising the target bit rate CTBR.

Further, the data CpbScale has a value indicating a negative value when the indicator data CPBOC is less than the initial value initialCpb, that is, making an adjustment in a direction lowering the target bit rate CTBR.

Further, as shown in FIG. 8, the data CpbScale abruptly becomes small in value when the indicator data CPBOC becomes the predetermined value (for example 180000) or less.

Due to this, underflow of the buffer CPB of the decoding device explained above is avoided.

The characterizing feature of the data CpbScale explained above is realized by the ST adjustment amount calculation circuit 13 calculating the data CpbScale by the above Equation (5).

Step ST22:

The ST adjustment amount calculation circuit 13 multiplies the data CpbScale and the input final target bit rate FTBR by the following Equation (6) to calculate the adjustment amount STAJ.

(Equation 6)

$$STAJ = FTBR * Cpb\text{Scale} \qquad (6)$$

[CTBR Calculation Circuit 14]

The CTBR calculation circuit 14 adds the input final target bit rate FTBR, the image difficulty indicator data DIFCT input from the image difficulty indicator generation circuit 6, the adjustment amount LTAJ input from the LT adjustment amount calculation circuit 12, and the adjustment amount STAJ input from the ST adjustment amount calculation circuit 13 by the following Equation (7) to calculate the target bit rate CTBR.

The CTBR calculation circuit 14 outputs the target bit rate CTBR to the PicQ control circuit 16.

(Equation 7)

$$CTBR = FTBR + DIFCT + LTAJ + STAJ \qquad (7)$$

[Delay Circuit 15]

The delay circuit 15 delays the Q scale QPic of the picture input from the PicQ control circuit 16 by exactly a time corresponding to 1 picture and outputs the result to the PicQ control circuit 16.

[PicQ Control Circuit 16]

The PicQ control circuit 16 calculates (determines) the Q scale QPic (quantization scale of the present invention) of the picture Q and outputs this to the delay circuit 15 and the MBQ control circuit 17.

The PicQ control circuit 16 calculates the Q scale QPic as follows based on the measurement bit rate CMBR input from the MBR measurement circuit 9 and the target bit rate CTBR input from the CTBR calculation circuit 14.

Specifically, the PicQ control circuit 16 calculates the Q scale QPic so as to make the measurement bit rate CMBR approach the target bit rate CTBR.

Figure 9:
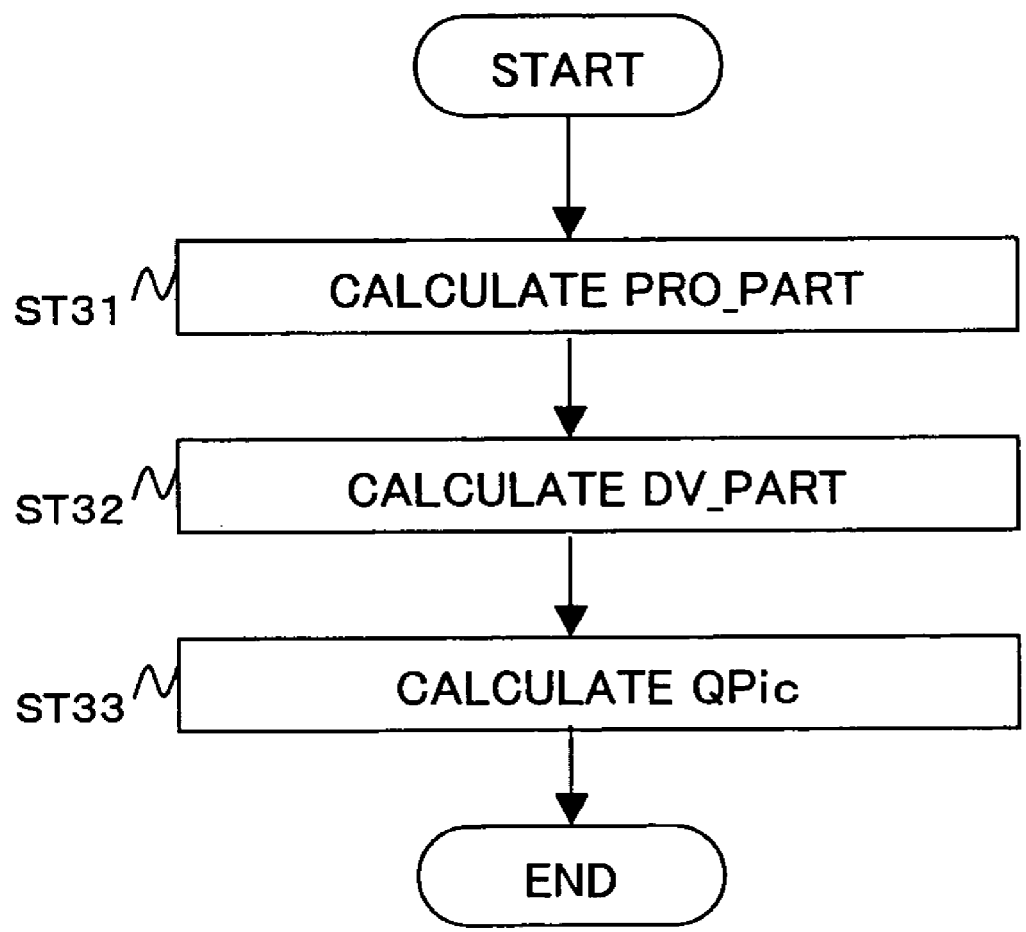
FIG. 9 is a flow chart for explaining the processing of a PicQ control circuit shown in FIG. 3.

FIG. 9 is a flow chart for explaining the processing of the PicQ control circuit 16.

Step ST31:

The PicQ control circuit 16 calculates the data PRO_PART by the following Equation (8) by using the measurement bit rate CMBR input from the MBR measurement circuit 9 and the target bit rate CTBR input from the CTBR calculation circuit 14.

Kp in Equation (8) is a coefficient for adjusting the response and is defined by using for example the measurement bit rate CMBR, the target bit rate CTBR, and the indicator data CPBOC.

By making the response low, the fluctuation of the quantization scale can be suppressed.

(Equation 8)

$$PRO\_PART = Kp * (CMBR/CTBR - 1) \qquad (8)$$

Step ST32:

The PicQ control circuit 16 calculates the data DV_PART by the following Equation (9) by using the measurement bit rate CMBR input from the MBR measurement circuit 9 and the target bit rate CTBR input from the CTBR calculation circuit 14.

Kd in Equation (9) is a coefficient for improving the response.

Further, n indicates the number of pictures. CMBR[n−1] indicates the CMBR of one previous picture of the picture corresponding to CMBR[n].

(Equation 9)

$$DV\_PART=Kd*(CMBR[n]-CMBR[n-1]) \quad (9)$$

Step ST33:

The PicQ control circuit 16 calculates the quantization scale QPic[n] by the following Equation 10 by using the quantization scale QPic[n−1] calculated the previous time, the data PRO_PART calculated at step ST31, and the data DV_PART calculated at step ST32.

(Equation 10)

$$QPic[n]=QPic[n-1]*(1+PRO\_PART+DV\_PART) \quad (10)$$

[MBQ Control Circuit 17]

The MBQ control circuit 17 calculates the quantization scale MBQ of each macro block MB in the picture based on the quantization scale PicQ of the picture input from the PicQ control circuit 16 and outputs this to the quantization circuit 26 and motion prediction and/or compensation circuit 36 shown in FIG. 2.

Below, the overall operation of the Q calculation circuit 34 shown in FIG. 3 will be explained.

Figure 10:
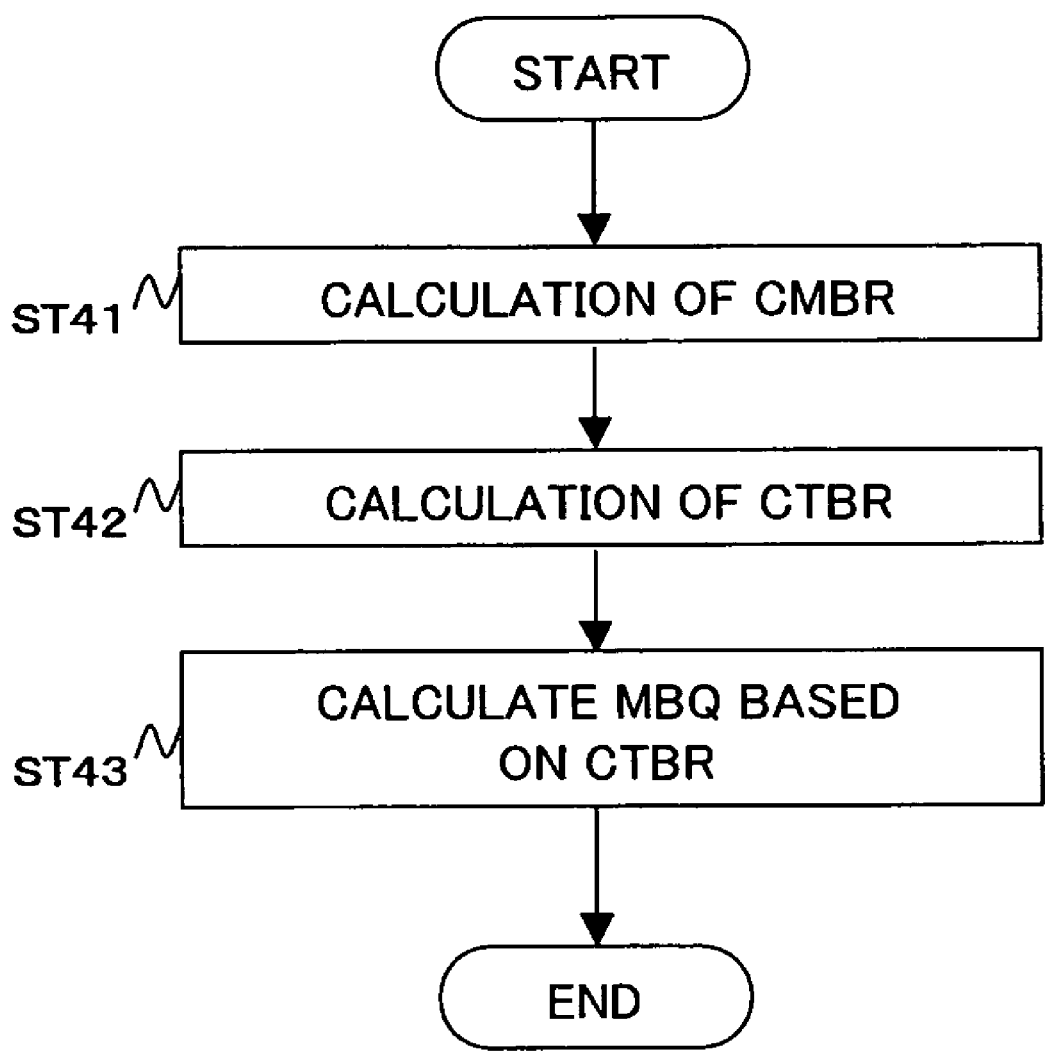
FIG. 10 is a flow chart for explaining an overall operation of the Q calculation circuit shown in FIG. 3.

FIG. 10 is a flow chart for explaining the overall operation of the Q calculation circuit 34 shown in FIG. 3.

Step ST41:

The MBR measurement circuit 9 of the Q calculation circuit 34 shown in FIG. 3 calculates the measurement bit rate CMBR in a sequence explained by using FIG. 4.

Step ST42:

The CPBOC calculation circuit 11, the LT adjustment amount calculation circuit 12, the ST adjustment amount calculation circuit 13, and the CTBR calculation circuit 14 shown in FIG. 3 calculate the target bit rate CTBR in the sequence explained by using FIG. 5 to FIG. 8.

Figure 11:
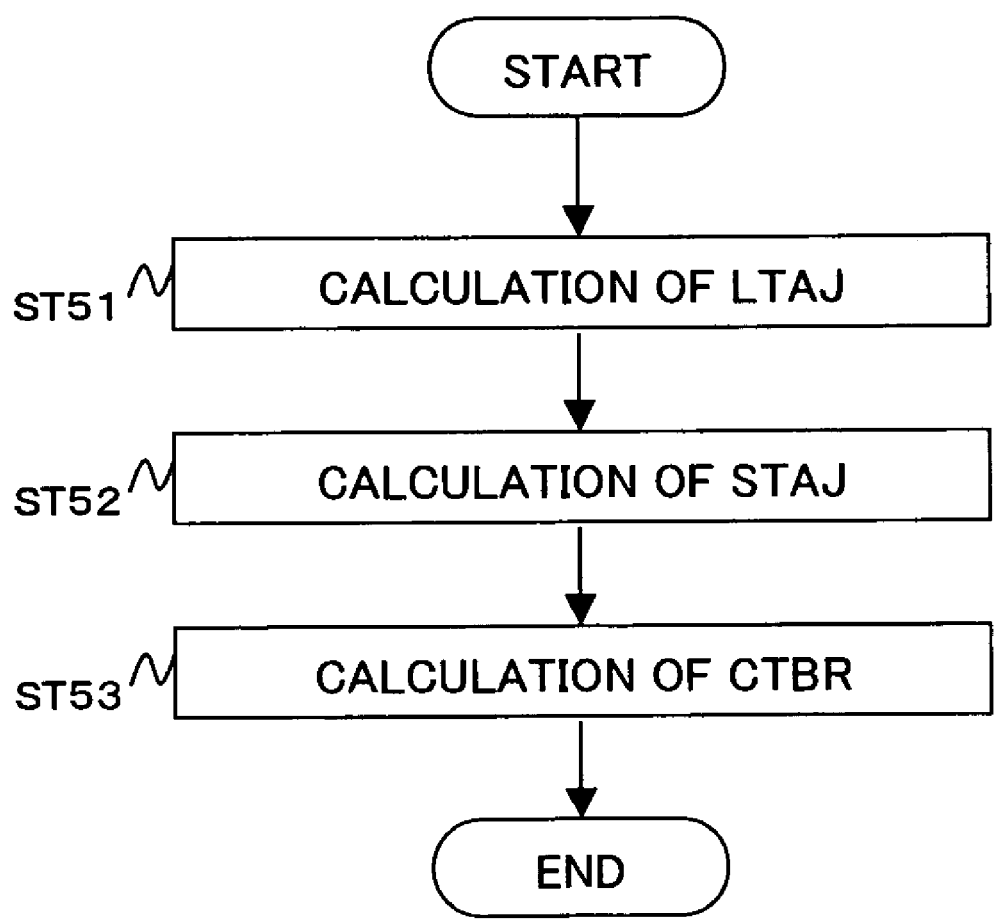
FIG. 11 is a flow chart for explaining the processing of step ST42 shown in FIG. 10.

Namely, as shown in FIG. 11, the LT adjustment amount calculation circuit 12 calculates the adjustment amount LTAJ (ST51) in the sequence explained before by using FIG. 5 and FIG. 6, the ST adjustment amount calculation circuit 13 calculates the adjustment amount STAJ (ST52) in the sequence explained before by using FIG. 7 and FIG. 8, and the CTBR calculation circuit 14 calculates the target bit rate CTBR (ST53) by using this.

Step ST43:

The PicQ control circuit 16 of the Q calculation circuit 34 calculates the quantization scale QPic of each picture based on the measurement bit rate CMBR calculated at step ST41 and the target bit rate CTBR calculated at step ST42 as explained by using FIG. 9, then calculates the quantization scale MBQ of each macro block MB and outputs this to the quantization circuit 26 and the motion prediction and/or compensation circuit 36.

Next, the overall operation of the encoding device 2 shown in FIG. 2 will be explained.

The image signal which becomes the input is first converted to a digital signal at the A/D conversion circuit 22. Next, in accordance with the GOP structure of the image compressed information which becomes the output, the image data is rearranged in the picture rearrangement circuit 23.

The Q calculation circuit 34 calculates the quantization scale MBQ based on the image data S23 from the picture rearrangement circuit 23 and the encoded data ED from the buffer 28 as previously explained and outputs this to the quantization circuit 26 and the motion prediction and/or compensation circuit 36.

For image data to be subjected to intra-encoding, the image information of the overall image data is input to the orthogonal transform circuit 25. The orthogonal transform circuit 25 applies a discrete cosine transform, Karhunen Loeve transform, or other orthogonal transform.

The transform coefficient output from the orthogonal transform circuit 25 is subjected to quantization processing at the quantization circuit 26 and output as the image data S25 to the reversible encoding circuit 27.

The quantization circuit 26 quantizes the image data S25 based on the quantization scale QP based on the quantization scale MBQ input from the Q calculation circuit 34.

The reversible encoding circuit 27 applies reversible encoding such as variable length encoding or arithmetic encoding to the image data S26 to generate the encoded data ED and outputs this to the buffer 28.

Simultaneously, the image data S26 from the quantization circuit 26 is input to the inverse quantization circuit 29 and further subjected to the inverse orthogonal transform processing at the inverse orthogonal transform circuit 30 to become the decoded image data. The image data is stored in the frame memory 31.

On the other hand, for an image to be subjected to inter-encoding, first, the image data S23 is input to the motion prediction and/or compensation circuit 36. Further, the image data S31 of the reference image is read out from the frame memory 31 and output to the motion prediction and/or compensation circuit 36.

Then, the motion prediction and/or compensation circuit 36 generates the motion vector MV and the predicted image data S32a by using the image data S31 of the reference image.

Then, the processing circuit 24 generates the image data S24 as a difference signal between the image data S23 from the picture rearrangement circuit 23 and the predicted image data S32a from the motion prediction and/or compensation circuit 36 and outputs the image data S24 to the orthogonal transform circuit 25.

Then, the reversible encoding circuit 27 performs reversible encoding processing such as variable length encoding or arithmetic processing on the motion vector MV and inserts the result into the header portion of the image data. The rest of the processing is the same as the image data to be subjected to the intra-encoding.

As explained above, the encoding device 2 determines the quantization scale MBQ by considering the amount of stored data of the buffer CPB of the decoding device 3 shown in FIG. 1 based on the encoded data ED from the buffer 28 in the Q calculation circuit 34.

For this reason, according to the encoding device 2, underflow of the buffer CPB of the decoding device 3 can be avoided, and the quality of the image decoded at the decoding unit 4 can be improved.

Further, the encoding device 2 determines the quantization scale MBQ based on the image difficulty indicator data DIFCT generated by the image difficulty indicator generation circuit 6 in the Q calculation circuit 34.

For this reason, the Q calculation circuit 34 can use many bits by making the quantization scale MBQ of the frame (picture) having a high difficulty of encoding small and can make the bit rate of the encoded data ED follow the encoding difficulty of the image data S23 being encoded and can provide a high quality image.

Further, according to the encoding device 2, as explained by using FIG. 4, the MBR measurement circuit 9 calculates the measurement bit rate CMBR based on the average amount of bits of a plurality of pictures and calculates the target bit rate CTBR based on this. For this reason, large fluctuation of the quantization scale MBQ of each picture due to the difference of the amounts of bits of pictures can be avoided.

Further, according to the encoding device 2, the processing load of the decoding unit 4 can be made uniform. Due to this, the image quality after the decoding can be improved.

Further, according to the encoding device 2, as shown in the above Equation (9), the PicQ control circuit 16 calculates the quantization scale QPic by feedback. By this as well, abrupt fluctuation in time of the quantization scale QPic can be suppressed.

Further, according to the encoding device 2, by adjusting the Kp in the above Equation (8), abrupt fluctuation of the quantization scale can be suppressed. By this as well, the processing load of the decoding unit 4 can be made uniform. Due to this, the image quality after the decoding can be improved.

Further, according to the encoding device 2, in the encoding difficulty detection circuit 5, by switching between whether the encoding difficulty is to be detected for the entire sequence or the encoding difficulty is to be detected for a portion of the sequence, variable bit rate control suitable for both multi-paths and a single path can be realized.

The present invention is not limited to the above embodiment.

Namely, a person skilled in the art may make a variety of changes, combinations, sub combinations, and substitutions concerning the components of the above embodiment within the technical scope of the present invention or a scope of equivalents thereof.

For example, the Q calculation circuit 34 shown in FIG. 3 may calculate the target bit rate CTBR based on only the final target bit rate FTBR and the image difficulty indicator data DIFCT from the image difficulty indicator generation circuit 6 in the CTBR calculation circuit 14.

Further, the CTBR calculation circuit 14 may calculate the target bit rate CTBR based on either of the adjustment amount STAJ or LTAJ, the indicator final target bit rate FTBR, and the image difficulty indicator data DIFCT.

INDUSTRIAL CAPABILITY

The present invention can be applied to a system quantizing processed data.

The invention claimed is:

1. A data processing apparatus for determining a quantization scale when quantizing and encoding processed data, the data processing apparatus comprising:
   a specifying circuit for specifying a bit rate used to provide encoded data for decoding, the bit rate being based on encoding of the encoded data;
   an encoding difficulty detection circuit for detecting encoding difficulty of processed data that is encoded;
   a quantization control circuit for controlling the quantization scale based on the bit rate and the encoding difficulty;
   an indicator generation circuit for generating, based on the encoded data, indicator data specifying an amount of stored data of a storage circuit provided at a decoding side, the storage circuit storing and supplying the encoded data for decoding; and
   a target calculation circuit for calculating a target bit rate indicating a target value of the bit rate based on the indicator data, wherein the quantization control circuit controls the quantization scale to cause the bit rate to approach a value based on the target bit rate.

2. A data processing apparatus as set forth in claim 1, wherein the quantization control circuit controls the quantization scale in relation to the detected encoding difficulty.

3. A data processing apparatus as set forth in claim 1, wherein the target calculation circuit calculates the target bit rate based on a difference between a designated final target bit rate and an average bit rate of past encoded data.

4. A data processing apparatus as set forth in claim 3, wherein the target calculation circuit calculates the target bit rate to avoid underflowing the storage circuit.

5. A data processing apparatus as set forth in claim 1, wherein the target calculation circuit calculates the target bit rate to avoid underflowing the storage circuit.

6. A data processing apparatus as set forth in claim 1, wherein the specification circuit specifies the bit rate of the encoded data read from the storage circuit and supplied for decoding at the decoding side.

7. A data processing apparatus as set forth in claim 6, wherein the specification circuit specifies the bit rate based on an average amount of bits of pictures in past encoded data and a picture rate of the pictures.

8. A data processing apparatus as set forth in claim 1, wherein when the encoded data is comprised of a plurality of pictures, the quantization control circuit controls the quantization scale for the plurality of pictures.

9. A data processing apparatus as set forth in claim 1, wherein the quantization control circuit determines a new quantization scale and controls the new quantization based on a ratio between the bit rate the target bit rate, and the previously determined quantization scale.

10. A data processing apparatus as set forth in claim 1, wherein the quantization control circuit determines a new quantization scale and controls the new quantization based on the bit rate, the target bit rate, and the previously determined quantization scale to suppress overshooting and undershooting of the bit rate.

11. An encoding device for determining a quantization scale when quantizing and encoding processed data, the encoding device comprising:
   a quantization scale calculation circuit for calculating the quantization scale;
   a quantization circuit for quantizing the processed data based on the quantization scale; and
   an encoding circuit for generating encoded data by encoding a quantization result generated by the quantization circuit, wherein the quantization scale calculation circuit comprises:
      a specifying circuit for specifying a bit rate used to provide encoded data for decoding, the bit rate being based on encoding of the encoded data;
      an encoding difficulty detection circuit for detecting an encoding difficulty of processed data that is encoded;
      a quantization control circuit for controlling the quantization scale based on the bit rate and the encoding difficulty;
      an indicator generation circuit for generating, based on the encoded data, indicator data specifying an amount of stored data of a storage circuit provided at a decoding side, the storage circuit storing and supplying the encoded data for decoding; and a target calculation circuit for calculating a target bit rate indicating a target value of the bit rate based on the indicator data, wherein the quantization control circuit controls the quantization scale to cause the bit rate to approach a value based on the target bit rate.

12. A data processing method for determining a quantization scale when quantizing and encoding processed data, the data processing method being executed by an encoding device and comprising:

specifying a bit rate used to provide encoded data for decoding, the bit rate being based on encoding of the encoded data;

detecting encoding difficulty of processed data that is encoded;

controlling the quantization scale based on the bit rate and the encoding difficulty;

generating, by using an indicator generation circuit in the encoding device, indicator data specifying an amount of stored data of a storage circuit provided at a decoding side, the amount being based on the encoded data stored in the storage circuit to be supplied for decoding; and calculating, by using the encoding device, a target bit rate indicating a target value of the bit rate based on the indicator data, wherein the quantization scale is controlled to cause the bit rate to approach a value based on the target bit rate.

* * * * *